July 18, 1967 M. H. GROVE 3,331,118
METHOD OF FABRICATING A VALVE BODY
Filed March 25, 1963 3 Sheets-Sheet 1
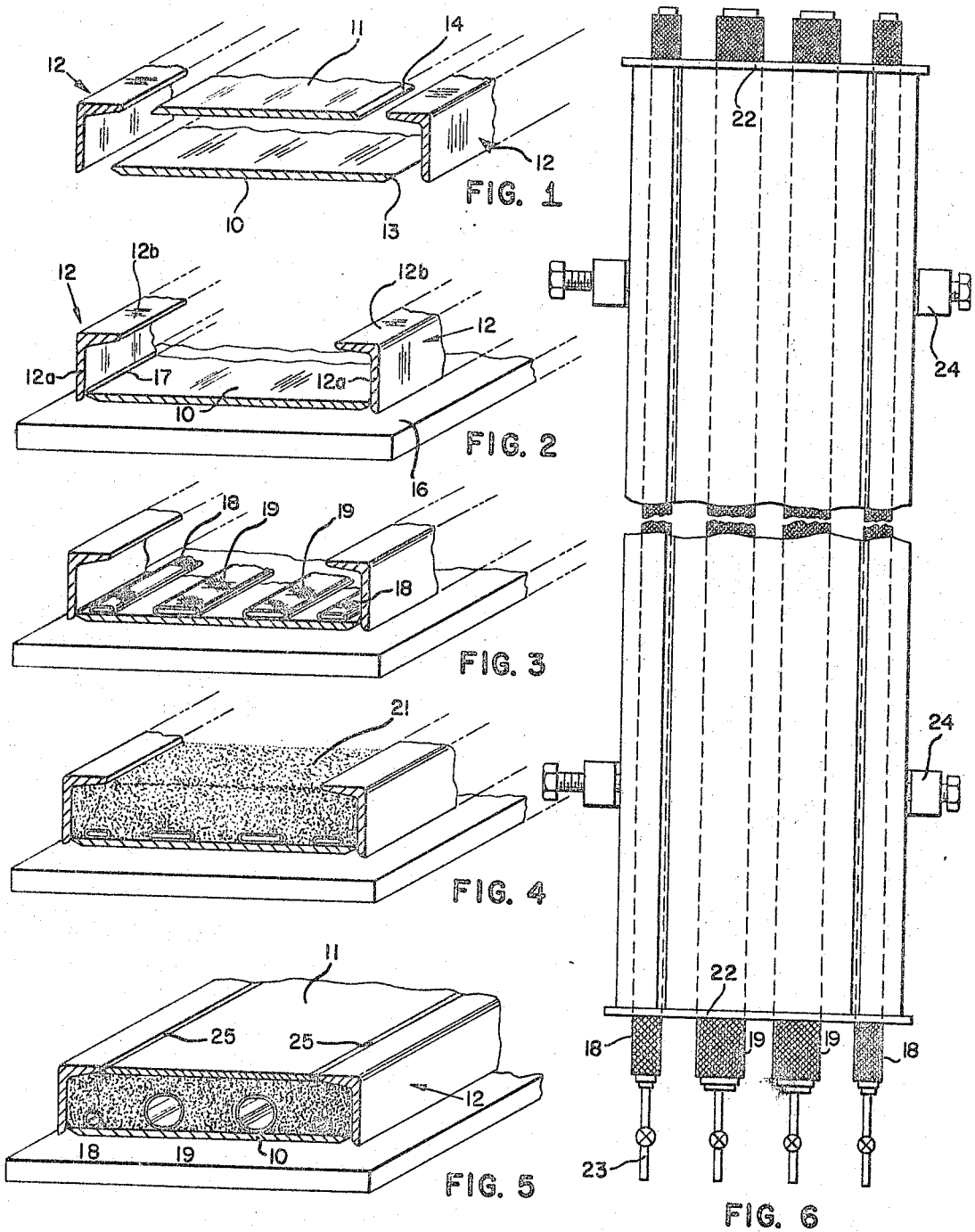
INVENTOR
MARVIN H. GROVE
BY
Flehr and Swain
ATTORNEYS July 18, 1967  M. H. GROVE  3,331,118
METHOD OF FABRICATING A VALVE BODY
Filed March 25, 1963  3 Sheets-Sheet 2

INVENTOR
MARVIN H. GROVE
BY
*Flehr and Swain*
ATTORNEYS

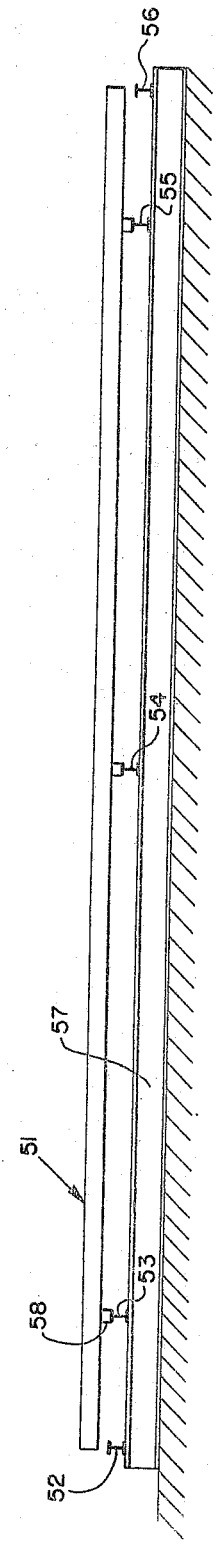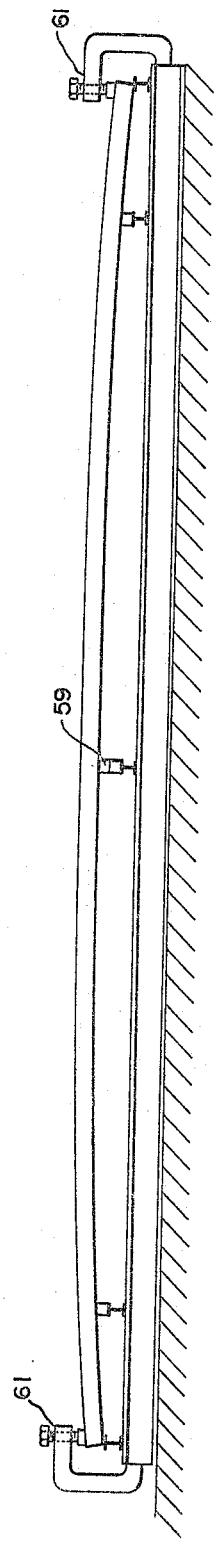

ated July 18, 1967

3,331,118
METHOD OF FABRICATING A VALVE BODY
Marvin H. Grove, Piedmont, Calif., assignor to M & J Valve Company, Houston, Tex., a corporation of Delaware
Filed Mar. 25, 1963, Ser. No. 267,524
4 Claims. (Cl. 29—157.1)

This invention relates generally to gate valve bodies of the fabricated type, and methods for their manufacture.

In the past, commercial valves have been made by use of structural steel shapes welded or bolted together. A typical valve body of this type may be rectangular in cross section, with the end and side walls comprising mill-rolled steel plates welded together at the corners of the rectangle. Fabrication of this type requires both internal and external welds, and since the walls have been torch cut from steel plate, considerable grinding must be carried out after welding to provide presentable corners. Also it is difficult in this type of fabrication method to maintain the side and end walls at right angles to each other.

Another method which can be employed is to use two mill-rolled channels of the same size, with the flanges forming the side walls, and with longitudinal seams between the edges of the flanges, made by internal and external welding operations. While this method reduces the amount of welding required, and provides corners of mill-rolled material, it has the disadvantage that for a given size gate valve, the flange dimensions of standard channels may not provide a body of the desired dimensions. Furthermore, here again both internal and external welding operations are required.

In general it is an object of the present invention to provide a new fabricating method for valve bodies and the like, which will overcome some of the difficulties of prior methods, and will be relatively inexpensive.

Another object of the invention is to provide a fabricating method of the above character which dispenses with heavy internal welding operations.

Another object of the invention is to provide a method of the above character which provides a valve body that is rectangular in cross section with good corners which do not require any substantial amount of grinding or finishing.

Additional objects and features of the invention will appear from the following description in which the preferred embodiments have been set forth in detail in conjunction with the accompanying drawing.

Referring to the drawing:

FIGURE 1 is an exploded view in perspective showing separate structural members such as may be used in my fabricating method.

FIGURE 2 is a view like FIGURE 1, showing how two structural angles are first lightly welded to a structural plate, to form a channel.

FIGURE 3 is similar to FIGURE 2, but shows inflatable members placed within the channel.

FIGURE 4 is similar to FIGURE 3, but shows granular vitreous flux introduced into the channel.

FIGURE 5 is a view similar to FIGURE 4, but showing the inflatable members expanded to compact the flux.

FIGURE 6 is a plan view showing the assembly of FIGURE 5, with connections being made to the inflatable members.

FIGURE 11 is a side elevational view of equipment which can be used during heavy longitudinal welding.

FIGURE 12 is a view like FIGURE 11 showing clamping means for holding a weld structure in bowed condition during cooling of the weld metal.

Figure 7:
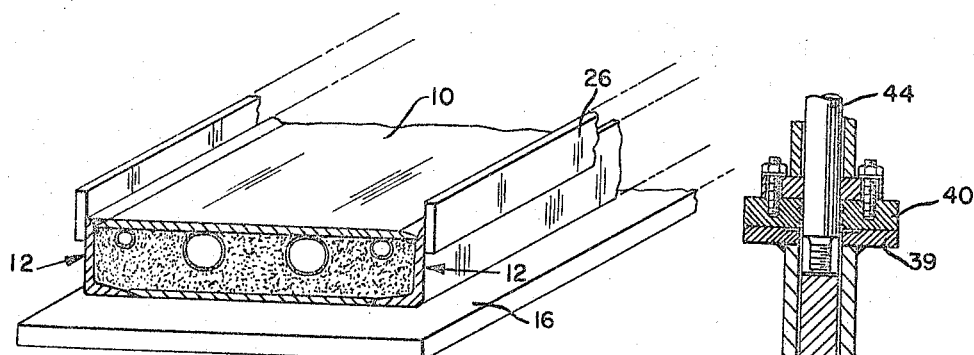
FIGURE 7 is a view like FIGURE 5, but showing the assembly inverted and guard strips applied, preparatory to further welding operations.

Referring first to FIGURE 1, there are shown structural members including the mill-rolled plates 10 and 11, and the angles 12. The plates 10 and 11 may be torch cut from a larger mill-rolled steel plate. In the torch cutting operation the longitudinal edges 13 of plate 10 are beveled as illustrated, and likewise the longitudinal edges of plate 11 are similarly beveled as indicated at 14. The angles 12 are selected in accordance with the dimensions desired in the finished body.

As shown in FIGURE 2, the plate 10 is first assembled with the angles 12, using for this purpose a suitable table 16 or other supporting surface. The flanges 12a extend at right angles to the plane of the plate 10, and flanges 12b overlie and are parallel to the plate 10. A light weld 17, made by machine or by hand, is applied to hold these parts together during subsequent operations.

The next step shown in FIGURE 3 is to apply the inflatable members 18 and 19. These members can be ordinary resilient tubing of the fire hose type. Note that members 19 are somewhat larger than the members 18, to provide somewhat greater displacement when inflated in the areas where they are located.

The next step illustrated in FIGURE 4 is to introduce a relatively inert vitreous granular material 21 into the assembly of FIGURE 3. This material may be one of the many granular fluxes used in submerged arc welding. Thus I may also use the material known as Union-Melt flux, which is a fused silicate, or any fused fluxes which are commonly employed for submerged arc welding. At the time the flux is applied, the ends of the channel structure are closed by suitable means, such as the end plates 22 shown in FIGURE 6. These end plates can be provided with openings (not shown) through which the extremities of members 18 and 19 extend, and may be held in place by light tack welding, or by suitable clamping means (not shown). The top surface of the body of flux can be struck off evenly at a suitable level.

The next step illustrated in FIGURE 5 is to apply the plate 11 upon top of the flux bed. After being properly located with respect to flanges 12b, it can be lightly tack welded to hold it in place. Also it may be desirable to hold it in place by suitable clamping means (not shown). After plate 11 is applied, the members 18 and 19 are inflated by applying air or a suitable gas under pressure (e.g., 20 to 30 p.s.i.). Inflation of the members 18 and 19 serves to compact the flux, whereby the flux body serves as back-up means during subsequent heavy welding operations. The degree of compaction is determined by the pressure applied.

The assembly now appears substantially as shown in FIGURE 6. End portions of the members 18 and 19 are connected to the air supply pipes 23. Also the end portions of members 18 and 19, where they extend through the plates 22, are made rigid to close the holes in the plates 22, when the members are deflated. Side clamps 24 are shown applied to the assembly to hold the angles in proper position for welding.

The next step is to carry out heavy exterior welding operations between the longitudinal edges of the plate 11, and the adjacent flanges 12b of the angles 12. These operations can be carried out by use of conventional submerged arc welding, using sufficient current to provide good penetration whereby in a single pass a weld is made which forms a complete junction, without the necessity of using an internal weld. The longitudinal welds 25 thus formed are indicated in FIGURE 5.

In forming the welds 25 it is desirable to make both welds simultaneously by the use of an automatic welding machine of the submerged arc type, having two operating beads. The size of the inner bead produced for given welding conditions can be adjusted by adjusting the air pressure applied to members 18 and 19. In general as this air pressure is increased, the size of the inner bead is reduced, due to greater compaction of the flux.

The next step, illustrated in FIGURE 7, is to discharge the flux and to invert the assembly upon the table 16, preparatory to carrying out external welding operations between the longitudinal edges of the plate 10, and the adjacent flanges of the angles 12. The flux can be easily discharged after members 18 and 19 have been deflated and removed with walls 22. Fused flux on the inner beads can be readily removed. It is desirable at this time to provide guard strips 26 along the sides of the assembly, to prevent spill-over of flux. These strips can be held in place by light tack welding, or by means of suitable side clamps (not shown). Here again the welding operations can be of the submerged arc type, with sufficient current being employed to obtain a complete weld in a single pass.

Figure 8:
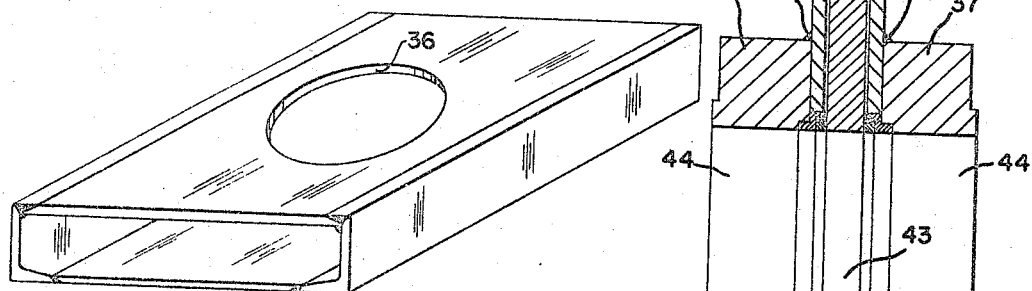
FIGURE 8 shows a completed body section with holes formed in the end walls for cooperating with hub members.

The box-like structure thus formed is now cut into sections of suitable length to form valve bodies, as for example the section illustrated in FIGURE 8.

It will be evident that the procedure described above greatly facilitates the manufacture of fabricated valve bodies. All of the heavy welding operations are external, requiring only a single pass to complete the desired junction. The heavy external welding operations are made possible by the use of the compacted flux bed. The complete structure has well formed corners which do not require grinding or other machining.

Figure 9:
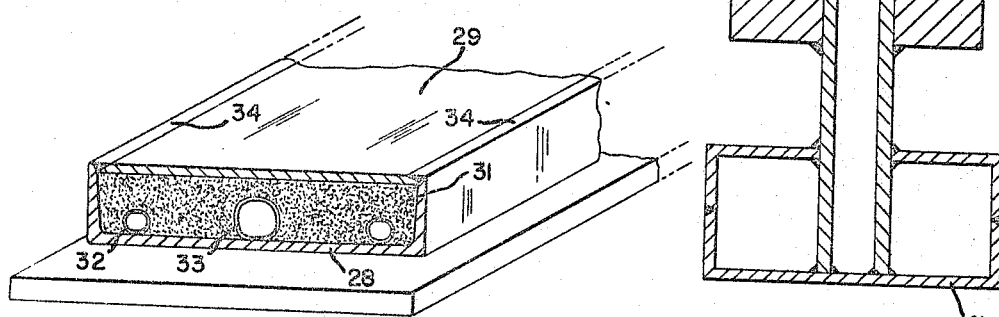
FIGURE 9 is a view like FIGURE 5, but showing a modification in which a mill-rolled channel is employed.

In the method as described above, a substantially channel-shaped structure is first formed by fabrication, as illustrated in FIGURE 2. In some instances it is possible to use a mill-formed channel 28 as shown in FIGURE 9, which is assembled with the plate 29. Here again before carrying out the heavy welding operations, the flux bed 31 is compacted by inflation of the members 32 and 33. Then external welding operations are employed, as by submerged arc welding, to form the longitudinal welds 34.

Figure 10:
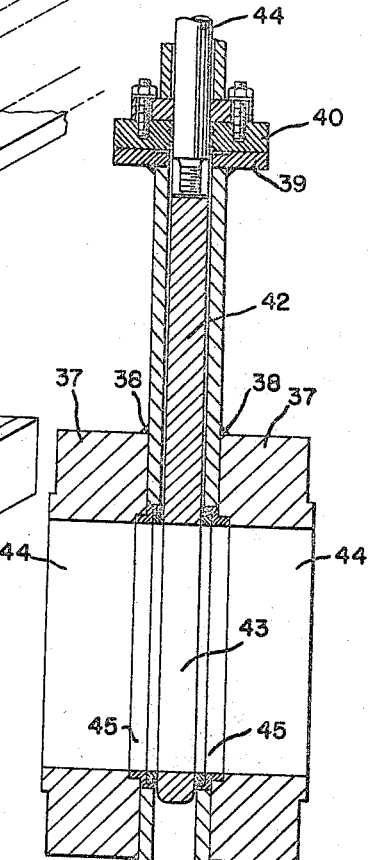
FIGURE 10 is a side elevational view in section showing a completed gate valve utilizing the body section shown in FIGURE 8.

FIGURE 10 shows a complete valve body made in accordance with my fabrication method. A section such as illustrated in FIGURE 8 is provided with aligned openings 36 in the end walls. The hubs or hub plates 37 are attached to the end walls as by welding 38. A flange 39 is fixed to one end of the body section as by welding, and serves to carry the bonnet plate 40. A suitable foot structure 41 is shown mounted upon the other end of the body section and serves to form an end closure. A plate-like gate 42 is positioned within the body, and is provided with a port 43 which registers with the passages 44 through the hub members 37, for open valve position. The gate is shown attached at one end to an operating stem or rod 44. Suitable annular assemblies 45 are carried by the body for sealing between the body and the side surfaces of the gate.

When valves are made in the larger sizes, it is difficult to prevent the box section assembly from assuming a final bow, following the first heavy weld. Thus when heavy welds are applied to an assembly as shown in FIGURE 5, the entire length bows upwardly in the middle, due to the heat involved, and thereafter as the welds cool, a bow develops in the reverse direction. I can prevent this by use of the equipment shown in FIGURES 11 and 12. The assembly 51 may in this instance correspond to that shown in FIGURE 5. It is laid upon the cross beams 52-56, which in turn rest upon the base beams 57. Blades 58 are interposed between beams 53-55 and the assembly. Immediately after the welds are made on the upper side the assembly bows upwardly in the manner shown in FIGURE 12. A supplemental blade 59 is now inserted at the middle of the assembly, and clamps 61 are applied at the ends to constrain the assembly in bowed condition. After the weld has cooled, clamps 61 are removed, and the assembly then springs to rectilinear form.

I claim:
1. In a method for fabrication of structures that are substantially rectangular in section, the steps of compacting granular vitreous welding flux into an assembly comprising a channel-shaped structure and a plate extending across the open side of the same, and then performing exterior welding operations along the junctions between the longitudinal edges of the plate and the adjacent portions of the channel.

2. A method as in claim 1 in which the flux is first introduced into the channel-shaped structure, then the plate located in the position desired, then the flux compacted, and finally said exterior welding operations carried out.

3. A method as in claim 1 in which the channel-shaped structure is first fabricated from two structural angles that are lightly welded to the longitudinal parallel edges of a second plate, whereby one flange of each channel extends at right angles to the second plate and the other flange of each angle is spaced from and parallel to the plate, said first-named plate being located between the edges of said other flanges, and in which exterior welding operations are performed after the welding operations on the first-named plate, to form weld connections between the longitudinal edges of the second-named plate and said other flanges.

4. In a method for the manufacture of valve bodies that are substantially rectangular in section, the steps of first forming a channel-shaped section by lightly welding two structural angles to longitudinal edges of a plate, with the welded flange of each angle extending at right angles to the plane of the plate, positioning elongated inflatable members within the channel and extending the length of the same, introducing granular vitreous welding flux into the channel to substantially fill the same, locating a plate upon the vitreous welding flux and between the edges of the other flanges of the angles, inflating said members to compact the flux, performing external welding operations to weld the longitudinal edges of the last-named plate to the adjacent edges of the angles, and performing external welding operations along the edges of the first-named plate to form weld connections between said first-named plate and the adjacent angles.

References Cited

UNITED STATES PATENTS

| | | | |
|---|---|---|---|
| 1,598,244 | 8/1926 | Crook | 251—329 |
| 1,828,478 | 10/1931 | Sparks | 251—329 |
| 2,142,109 | 1/1939 | Burke | 29—493 X |
| 2,466,562 | 4/1949 | Steinberger | 29—423 X |
| 2,518,834 | 8/1950 | Streckfus et al. | 29—423 |
| 2,843,920 | 7/1958 | Swartz et al. | 29—157.1 |
| 2,869,221 | 1/1959 | Siepman | 29—157.1 |
| 3,123,101 | 3/1964 | Blount et al. | |
| 3,155,477 | 11/1964 | Swarts | 29—423 X |

JOHN F. CAMPBELL, *Primary Examiner.*

LAVERNE D. GEIGER, *Examiner.*

A. ROSENTHAL, J. L. CLINE, *Assistant Examiners.*